United States Patent
Rahman (10) Patent No.: US 11,714,177 B2
(45) Date of Patent: Aug. 1, 2023

(54) IDENTIFYING VERTICAL HEIGHT OF USER EQUIPMENT WITH NETWORK ASSETS

(71) Applicant: T-Mobile Innovations LLC, Overland Park, KS (US)

(72) Inventor: Muhammad Tawhidur Rahman, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/453,272

(22) Filed: Nov. 2, 2021

(65) Prior Publication Data

US 2023/0134751 A1 May 4, 2023

(51) Int. Cl.
*H04W 16/28* (2009.01)
*G01S 11/06* (2006.01)

(52) U.S. Cl.
CPC ............ *G01S 11/06* (2013.01); *H04W 16/28* (2013.01)

(58) Field of Classification Search
CPC ................. G01S 11/06; H04W 16/28
See application file for complete search history.

(56) References Cited

U.S. PATENT DOCUMENTS

| | | | |
|---|---|---|---|
| 11,483,791 B2* | 10/2022 | Stirling-Gallacher | ...................... H04B 7/0617 |
| 2003/0117320 A1* | 6/2003 | Kim | ...................... G01S 11/02 342/457 |
| 2013/0203430 A1* | 8/2013 | Gan | ...................... H04W 48/18 455/450 |
| 2018/0049149 A1* | 2/2018 | Lee | ...................... H04W 24/10 |
| 2020/0145977 A1* | 5/2020 | Kumar | ................... H04L 5/0048 |
| 2021/0048502 A1* | 2/2021 | Gummadi | ................. G01S 3/72 |
| 2022/0155404 A1* | 5/2022 | Kumar | ................... G01S 5/0236 |

FOREIGN PATENT DOCUMENTS

WO WO-2015044078 A1 * 4/2015 ........... H04L 5/0005

* cited by examiner

*Primary Examiner* — Kenneth T Lam
(74) *Attorney, Agent, or Firm* — Shook, Hardy & Bacon L.L.P.

(57) ABSTRACT

In various embodiments, a system for identifying a vertical height of a user equipment using network-side components, instead of device-side components, is described. The system may include a fixed antenna of a node and a processor. The antenna sends a first beam having a first set of beam characteristics and receives a first signal strength indication from the user equipment based upon the first beam. The antenna then sends a second beam having a second set of beam characteristic and receives a second signal strength indication from the user equipment based upon the second beam. The processor may then analyze the first signal strength and the second signal strength to determine the vertical height of the user equipment, such as by a trigonometric calculation based upon an inclination of the beams and various known distances.

17 Claims, 9 Drawing Sheets

IDENTIFYING VERTICAL HEIGHT OF USER EQUIPMENT WITH NETWORK ASSETS

BACKGROUND

In prior art systems, telecommunications networks generally and emergency call systems (such as 911) specifically lack a method of identifying a vertical height of user equipment (e.g., a cellphone). The vertical height of the user equipment can be very important in locating the user equipment and, by extension, the person making an emergency call. If the person making the emergency call is in a tall building, traditional telecommunications networks and emergency call systems lack a way to identify the floor on which the caller is located. Some prior art systems rely on a sensor (such as a barometer) in the user equipment to report an altitude. However, these prior art systems have numerous drawbacks. First, not all user equipment has such a sensor. Older and/or less sophisticated user equipment may not be manufactured with a barometric sensor. Second, these sensors have a tendency to lose accuracy over time. Third, these sensors are susceptible to inaccuracies due to weather changes.

SUMMARY

The present disclosure is directed, in part, to identifying a vertical height of user equipment, such as a cell phone, using components of the network, so as to not rely on sensors of the user equipment. Aspects described herein may use beamforming to identify a specific vertical angle relative to an antenna of the network. The vertical height of the user equipment may be determined based at least in part upon the vertical angle, a known height of the antenna, and a known distance between the antenna and the user equipment. The vertical height may be converted into an estimated floor upon which the user equipment may be located. The vertical height and/or the estimated floor may be provided to the emergency call system by the network. Emergency responders, dispatchers, or others may then use the vertical height and/or estimated floor to locate the user equipment.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more base stations to provide wireless access to a network. For example, in a wireless telecommunication network, a plurality of access points, each providing service for a cell or a sector of a cell, are used to transmit and receive wireless signals to/from one or more UEs. An access point may be considered to be one or more otherwise-discrete components comprising an antenna, a radio, and/or a controller, and may be alternatively referred to as a "node," in that it is a point of origin for the communication link between the wired and wireless portions of the communication system. In aspects, a node may be defined by its ability to communicate with a UE according to a single protocol (e.g., 3G, 4G, LTE, 5G, and the like); however, in other aspects, a single node may communicate with a UE according to multiple protocols.

As used herein, the terms "cell" or "node" may be specific nodes, base stations, or access points that can be considered to be discrete from one another. While cells and nodes may be referred to herein with respect to its protocol, it should be understood that any particular cell or node may be capable of operating in any one or more of any suitable wireless communication protocol, using any one or more frequencies, frequency bands, channels, and the like. The terms "user device," "user equipment," "UE," "mobile device," "mobile handset," and "mobile transmitting element" may be used interchangeably in this description.

By way of background, beamforming is commonly used by telecommunications carriers for many reasons. Some of those reasons include the ability to reach select UEs (e.g., user devices at the cell edge), and to provide better speeds to UEs. In aspects, an antenna array associated with a node may be configured for beamforming, wherein one or more downlink signals can be transmitted in beams having different beam profiles. As used herein, a beam profile or a radiation pattern may be associated with a particular signal, set of signals, antenna, or set of antennas, and may be said to have a vertical beamwidth and a horizontal beamwidth; the horizontal beamwidth is the angular width (i.e., azimuth) of a beam and the vertical beamwidth is the angular height of the beam. For example, traditional macro cells may have an approximately a 120 degree horizontal beamwidth (i.e., a downlink signal is transmitted to UEs in ⅓ of the horizontal plane centered on the antenna) and a 15 degree vertical beamwidth. In aspects, a vertical beamwidth may be fixed (e.g., in a range of 7-15 degrees) or dynamic (e.g., using beamforming techniques, the vertical beamwidth may change in response to network conditions or UE demand). Aspects of this disclosure may be primarily concerned with the vertical beamwidth, as to determine the height of a user equipment (such as user equipment).

A first aspect of the present disclosure is directed to a system for identifying a vertical height of a user equipment, the system comprising a fixed antenna, a processor, and one or more computer storage hardware devices storing computer-usable instructions that, when used by the processor, cause the processor to perform a method. The processor may send, from the fixed antenna, a first beam having a first set of beam characteristics. The processor may acquire a first signal strength indication from the user equipment based upon the first beam. The processor may send, from the fixed antenna, a second beam having a second set of beam characteristics. The processor may acquire a second signal strength indication from the user equipment based upon the second beam. The processor may then analyze the first signal strength and the second signal strength to determine the vertical height of the user equipment.

A second aspect of the present disclosure is directed to a computerized method that includes sending, from a fixed antenna, a first beam having a first beam inclination and acquiring a first signal strength indication from a user equipment based upon the first beam. The computerized method further includes sending, from the fixed antenna, a second beam having a second beam inclination different than the first beam inclination and acquiring a second signal strength indication from the user equipment based upon the second beam. The computerized method may then determine the vertical height of the user equipment by analyzing the first signal strength and the second signal strength.

According to another aspect of the technology described herein, a system is provided for identifying a vertical height of a user equipment during an emergency call. The system may include an emergency call system, a fixed antenna, a processor, and one or more computer storage devices. The emergency call system is configured to respond to the emergency call from a UE. The processor is configured to receive, from the emergency call system, a request for the vertical height of the user equipment. In response to the request, the processor may send, from the fixed antenna, a first beam having a first set of beam characteristics and acquire a first signal strength indication from the user equipment based upon the first beam. The processor may then send, from the fixed antenna, a second beam having a second set of beam characteristics and acquire a second signal strength indication from the user equipment based upon the second beam. The processor may then analyze the first signal strength and the second signal strength to determine the vertical height of the user equipment. The processor may then send, to the emergency call system, an indication of the determined vertical height.

Figure 1:
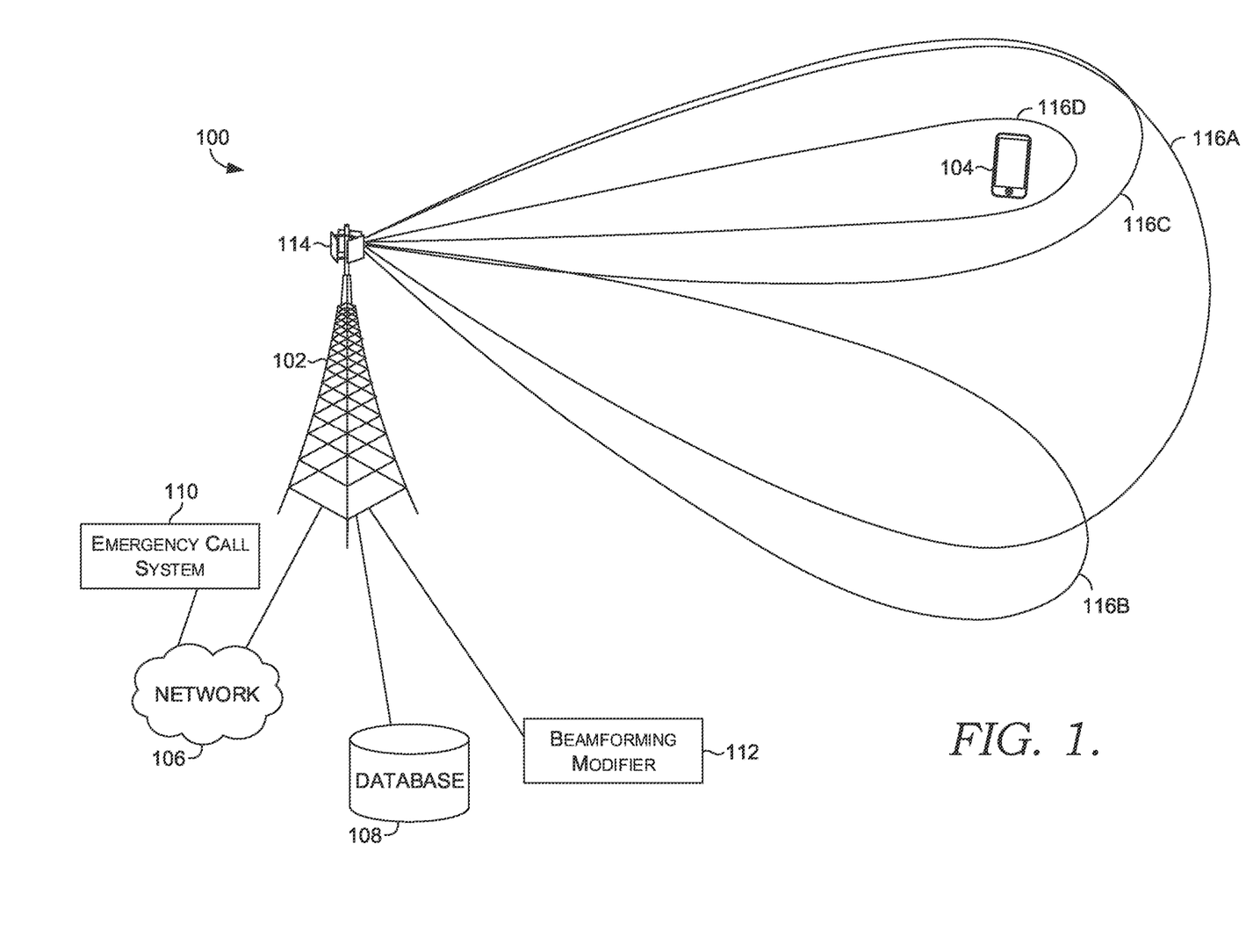
FIG. 1 depicts a diagram of an exemplary computing environment suitable for use in implementations of the present disclosure.

FIG. 1 depicts a diagram of an exemplary network environment 100 suitable for use in implementations of the present disclosure. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes node 102 that is configured to communicate to one or more UEs 104. The network environment 100 may include a wireless communications network 106, database 108, emergency call system 110, beamforming weight modifier 112. The node 102 may include an antenna 114 configured to generate a beam 116 (shown in various forms as 116A-D in FIG. 1) to communicated with the UE 104. In network environment 100, the UE may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with node 102 in order to interact with a public or private network.

Figure 5:
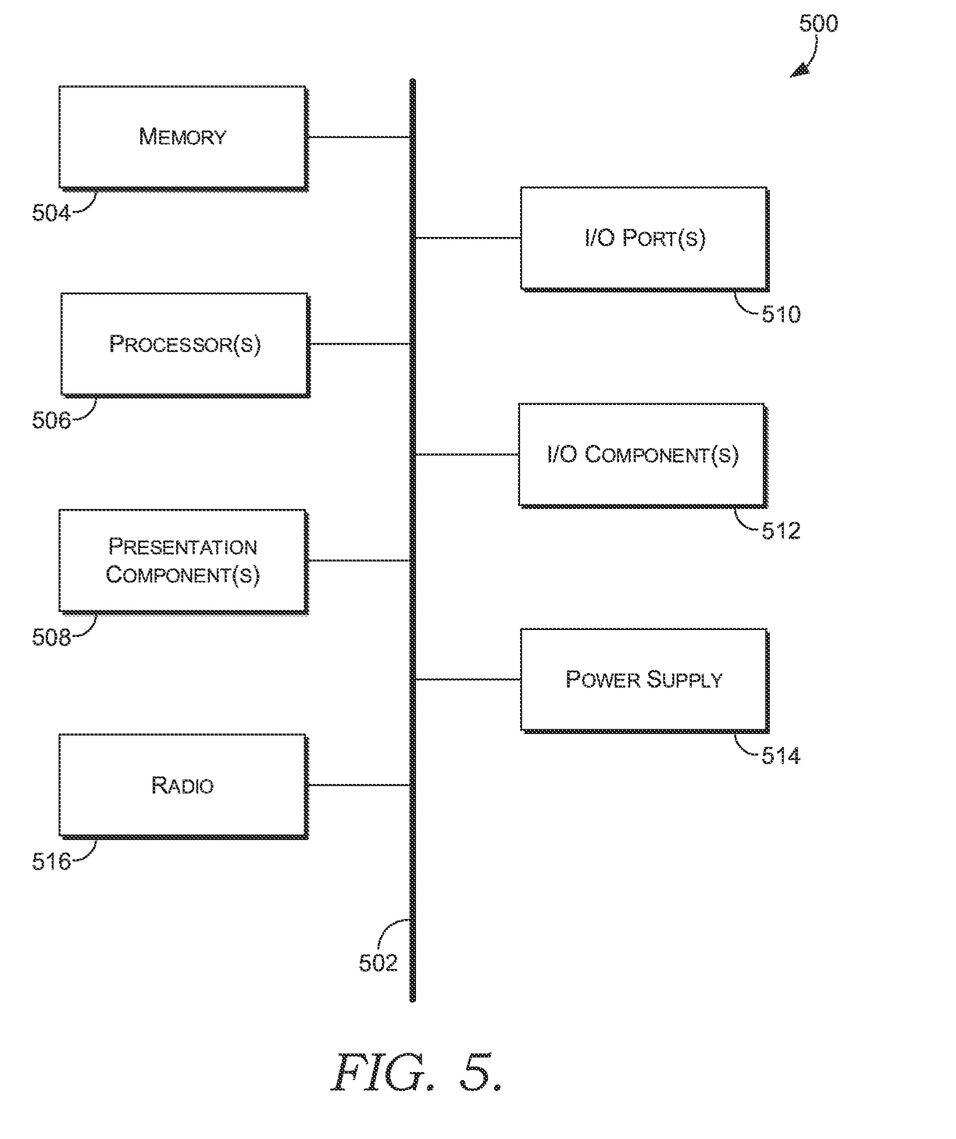
FIG. 5 depicts an exemplary computing environment suitable for use in implementations of the present disclosure.

In some aspects, the UE 104 may correspond to any of various types of electronic device, such as computing device 500 in FIG. 5. Thus, a user equipment can include, for example, a display(s), a power source(s) (e.g., a battery), a data store(s), a speaker(s), memory, a buffer(s), a radio(s) and the like. In some implementations, a user equipment comprises a wireless or mobile device with which a wireless telecommunication network(s) can be utilized for communication (e.g., voice and/or data communication). In this regard, the user equipment can be any mobile computing device that communicates by way of a wireless network, for example, a 3G, 4G, 5G NR, LTE, CDMA, 6G, or any other type of network.

In some cases, user equipment 104 in network environment 100 can optionally utilize a network 106 to communicate with other computing devices (e.g., a mobile device(s), a server(s), a personal computer(s), etc.) through node 102. Network 106 may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. The network can include multiple networks, as well as being a network of networks, but is shown in more simple form so as to not obscure other aspects of the present disclosure.

The network 106 can be part of a telecommunications network that connects subscribers to their immediate service provider. In some instances, the network 106 can be associated with a telecommunications provider that provides services (e.g., voice, data, SMS) to user equipment. For example, the network 106 may provide voice and non-voice services, including SMS, and/or data services to user equipment or corresponding users that are registered or subscribed to utilize the services provided by a telecommunications provider. The network 106 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), a 5G NR network or a 6G network.

In some embodiments, the network 106 may connect the telecommunications network to the emergency call system 110. In other embodiments, the emergency call system 110 may be a component of the telecommunications network. The emergency call system 110 handles received calls from various UEs to an emergency number (or other emergency indication). The telecommunications network may access a user database to identify information associated with the UE or associated phone account (such as a name and address of the subscriber). The telecommunications network may additionally locate the UE using any of various location methods, such as a method described herein. The identification information and location information may be sent, in the form of Automatic Name and Location Information (ANI/ALI), along with the forwarded call to the emergency call system 110. The identification information and location information may help the emergency call system 110 identify who is calling and where they are calling from. This allows the emergency call system 110 to locate the person to send whatever assistance is requested.

In some implementations, node 102 is configured to communicate with UEs 104 and other electronic devices that are located within the geographical area, or cell, covered by the one or more antennas of node 102. Node 102 may include one or more base stations, nodes, base transmitter stations, radios, antennas, antenna arrays, power amplifiers, transmitters/receivers, digital signal processors, control electronics, GPS equipment, and the like. In one aspect, node 102 is a gNodeB, while in another aspect, node 102 is an eNodeB. In particular, UEs may communicate with node 102 according to any one or more of a variety of communication protocols, in order to access the network.

As shown in FIG. 1, the UE 104 may be served by any of various beams 116A-D from the antenna 114 of the node 102. The beam 116 from the antenna 114 may have a set of beam characteristics, which may include a width and inclination (shown in more detail in FIG. 2). UE 104 may, in one aspect, be located outside of the current coverage area of one of the beams, such as beam 116B. Various aspects of beams 116A-D, such as the width, the inclination, the phase, and/or and amplitude, may be modified by the beamforming modifier 112. One or more aspects of a first beam 116A may be modified to form a second beam 116B, a third beam 116C, a fourth beam 116D, etc. For each subsequent beam, one or more aspects of the beam (e.g., one or more beam characteristics) may be modified. A signal strength associated with the subsequent beam 116B-D may be compared to a signal strength of the first beam 116A (and/or other subsequent beams). By analyzing the signal strength and/or other aspects of a return signal from the UE 104, a more precise estimated vertical height of the UE 104 may be iteratively determined.

Figure 2:
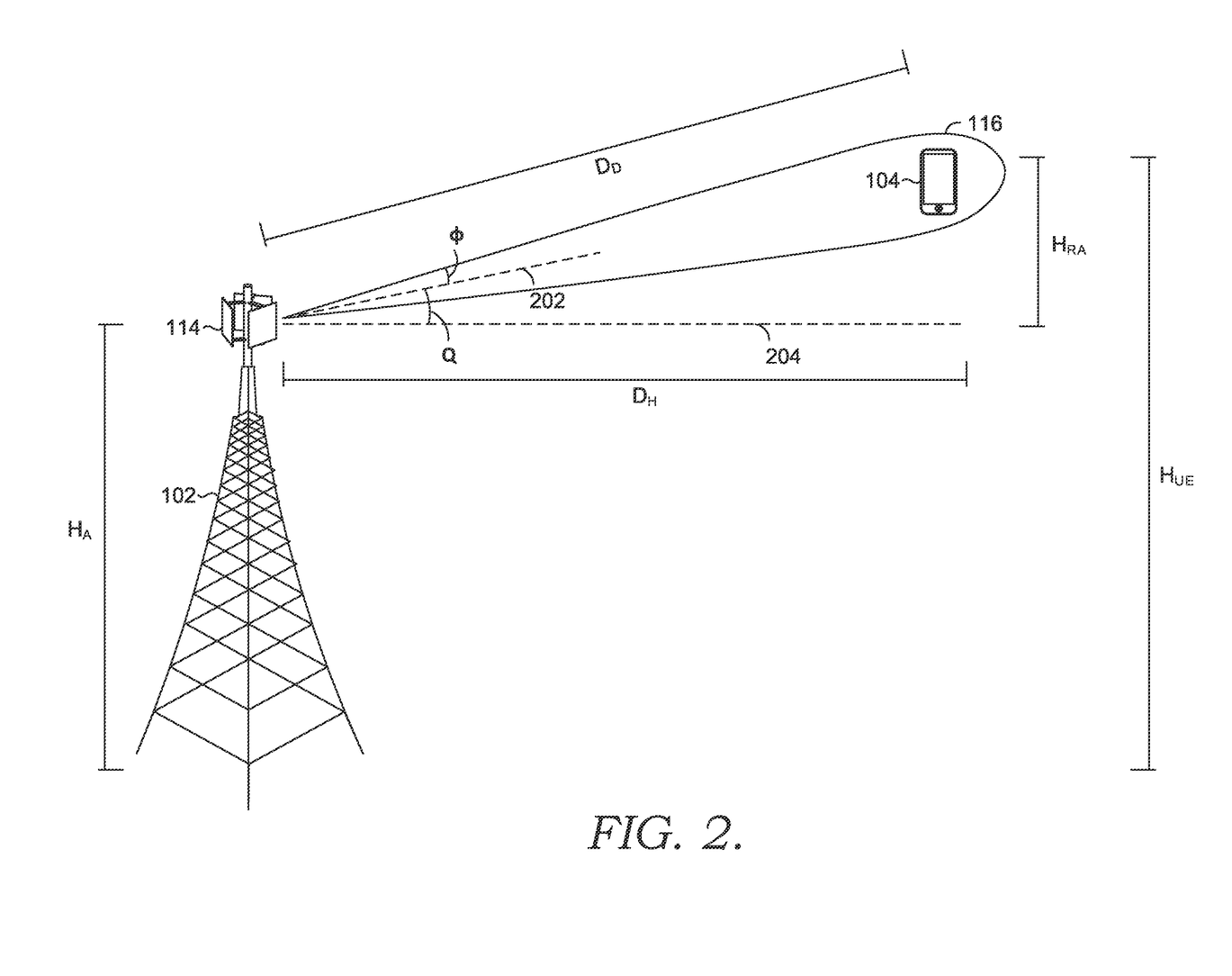
FIG. 2 depicts a diagram of how the vertical height of a user equipment may be measured in implementations of the present disclosure.

FIG. 2 depicts a diagram illustrating how the height of UE 104 is determined based upon the set of beam characteristics of beam 116. In aspects herein, the height of UE 104 is determined based at least in part on a trigonometric calculation. Once the beam characteristics of beam 116 are refined, as discussed in FIGS. 3-4, the height of UE 104 is calculated. A beam inclination θ of the beam 116 is a measure of a vertical angle of a beam direction axis 202 relative to reference axis 204 (e.g., a horizontal axis extending from the antenna, or relative to some other reference point). The beam inclination θ, as shown in FIG. 2, is a measure of an angular verticality of beam 116 and may be used to calculated the height of UE 104. Generally, once refined, the beam direction axis 202 points to the UE 104 from the antenna 114.

A beam width φ is an angular measure of how wide the beam is relative to the beam direction axis 202. A smaller beam width φ may create more precision in the estimated beam direction axis 202. A wider beam width φ may create less precision in the estimated beam direction axis 202. As such, the beam width φ, as one characteristic of the set of beam characteristics, may be reduced in the iterations discussed herein to increase the likelihood that the beam direction axis 202 points to the UE 104. Greater variability in the signal strength may be detected using a smaller beam width φ. As such, the system may have an increased confidence in the accuracy of the beam direction axis 202 if the beam width φ is relatively small.

The height of the UE 104 may, in embodiments, be calculated by a trigonometric calculation based at least in part upon the beam inclination θ. As can be seen in FIG. 2, a right triangle is formed between the antenna 114, the UE 104, and the reference axis 204. The trigonometric calculation determines a height relative to the antenna $H_{RA}$. The height relative to the antenna $H_{RA}$ added to a known height of the antenna HA gives a height of the UE $H_{UE}$. The height of the UE $H_{UE}$ may then be converted to a number of floors or other estimation that may be more useful to the emergency call system 110.

In some embodiments, a horizontal distance $D_H$ between the antenna 114 and the UE 104 may be known. The horizontal distance $D_H$ may be known based upon location data for the UE 104 and the antenna 114. The location data for the UE 104 may be based upon a location element in the UE 104 (such as a GPS receive) or may be based upon triangulation by the network among two or more nodes 102. In these embodiments, the height relative to the antenna $H_{RA}$ may be calculated based upon $\tan \theta = H_{RA}/D_H$, such that $H_{RA}=D_H*\tan \theta$.

In other embodiments, a direct distance $D_D$ between the antenna 114 and the UE 104 may be known. The direct distance $D_D$ may be known based upon a time of flight for the beam and response from the UE 114. In these embodiments, the height relative to the antenna $H_{RA}$ may be calculated based upon $\sin \theta = H_{RA}/D_D$, such that $H_{RA}=D_D*\sin \theta$.

In still other embodiments, other measurements relative to the antenna 114 and the UE 104 may be known and thus used in the calculation. It should be appreciated that in some embodiments, two or more antennas 114 may perform the described functions to verify the estimated height of the UE.

FIGS. 3A-E illustrate iterative steps in refining the set of beam characteristics such that an accurate beam direction axis 202 can be determined. The beam direction axis 202 defines the beam inclination θ for use in the above-discussed calculation for the height of the UE ($H_{UE}$). It should be appreciated that the steps and refinements made in these figures are provided for exemplary purposed only, and not for limitation. Other aspects may use other refinements in determining the correct beam direction axis 202 to point to the UE 104.

Figure 3A:
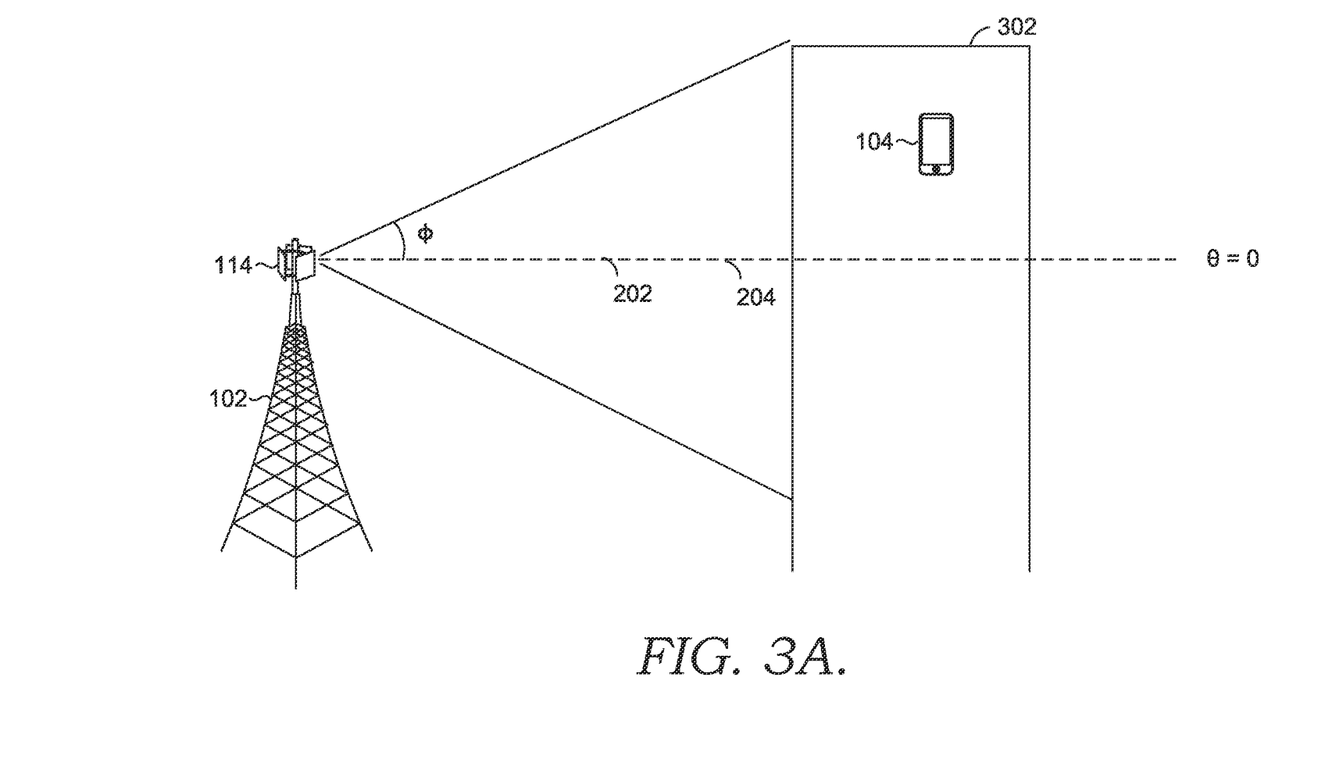
FIGS. 3A-E depict various iterations in which an inclination and a beam width are modified to identify the location of the user equipment.

In FIG. 3A, a beam direction axis 202 is generally aligned with the reference axis 204. The beam width φ may also be relatively wide so as to cover a large area. It should be appreciated that this may be a beam originally connecting the UE 104 to the network. The node 102 may be connecting the UE 104 to the network to fulfill the emergency call, check the status of the UE 104, or perform other functions. The node 102 may be connected to numerous UEs throughout the area. The vertical location of the UE 104 may be requested by the emergency call system due to receipt of an incoming emergency call, or the system may perform the steps discussed herein automatically upon the emergency call. The antenna 114 may receive or determine, directly or indirectly, one or more metrics related to performance of the beam (which may include signal strength).

Figure 3B:
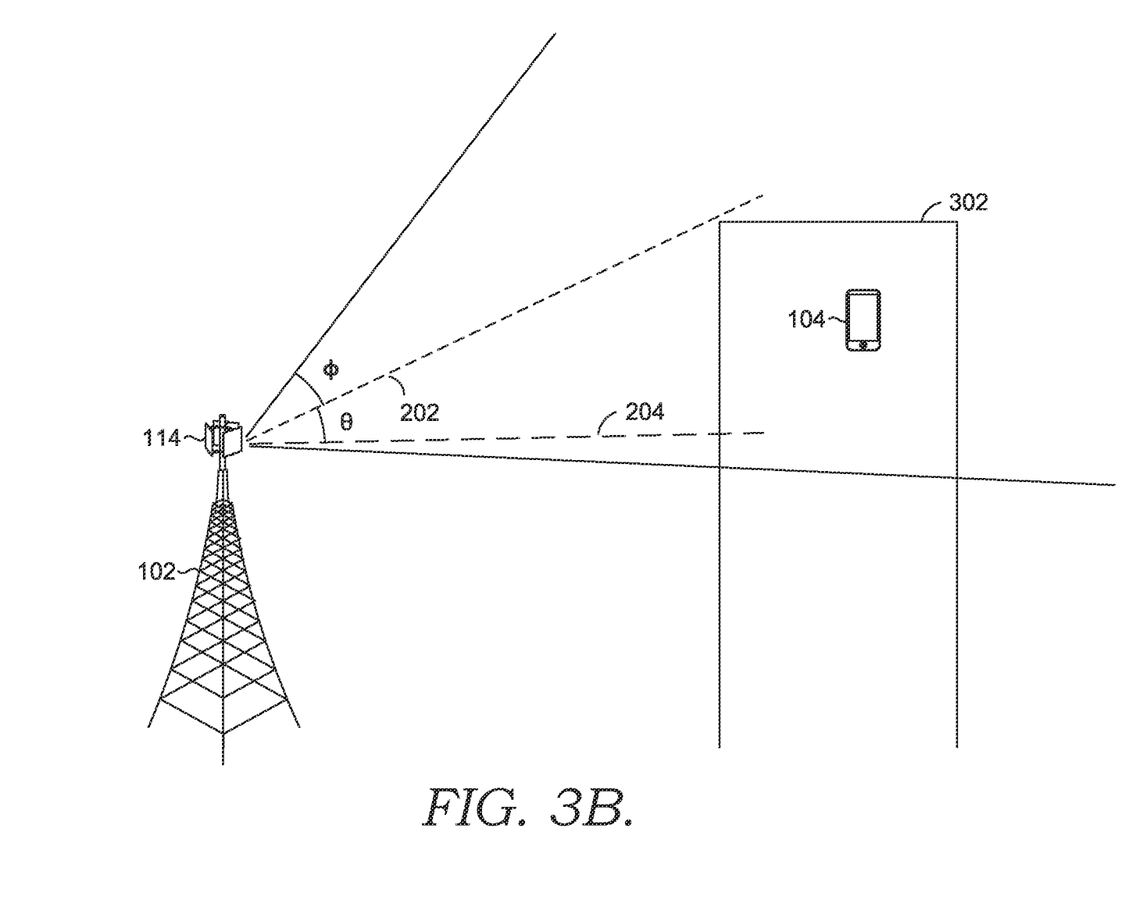

In FIG. 3B, the beam direction axis 202 is raised relative to the reference axis 204. In this example, the beam width φ remains constant. The signal strength, or other metric, may then be compared to the related metric from FIG. 3A.

Figure 3C:
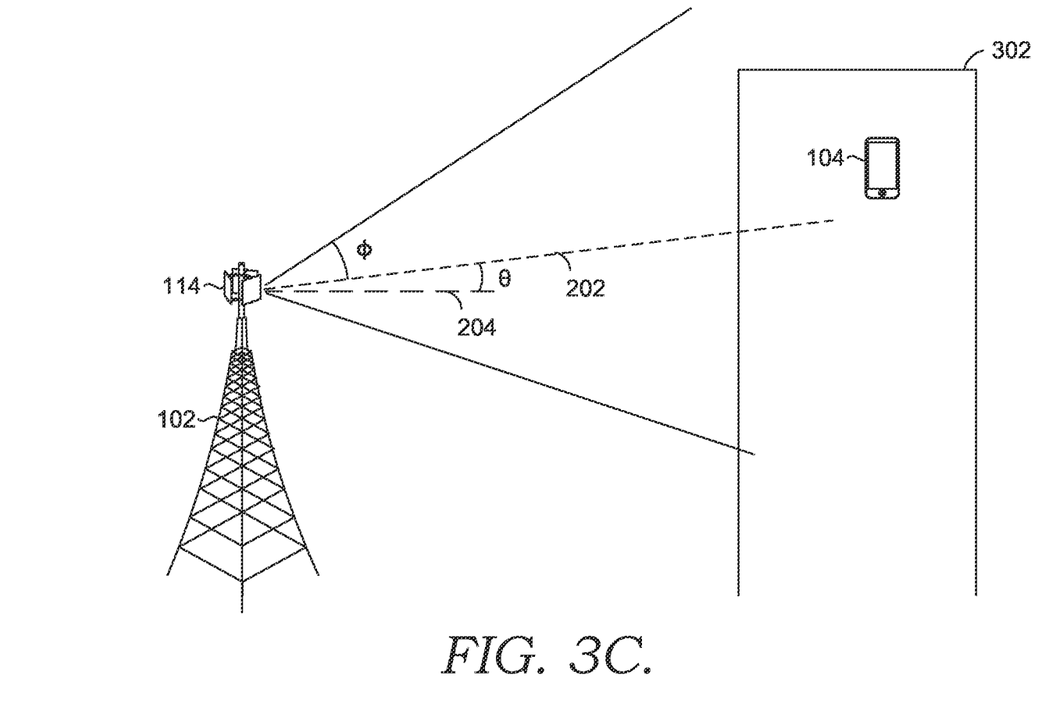

In FIG. 3C, the beam direction axis 202 is lowered relative to the reference axis 204. This may be because it is estimated that the UE 104 is between the beam direction axes of FIGS. 3A and 3B. In this way, the antenna 114 may "bracket" in the correct beam direction axis. In this example, the beam width φ remains constant. The signal strength, or other metric, may then be compared to the related metric from FIGS. 3A and/or 3B.

Figure 3D:
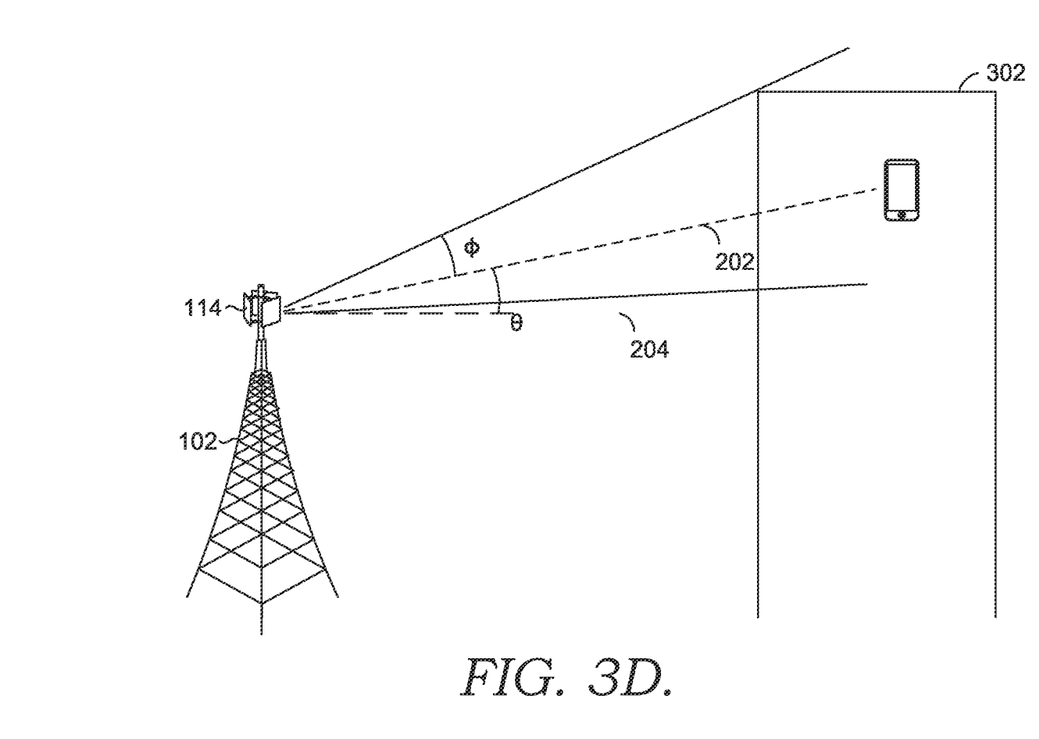
Figure 3E:
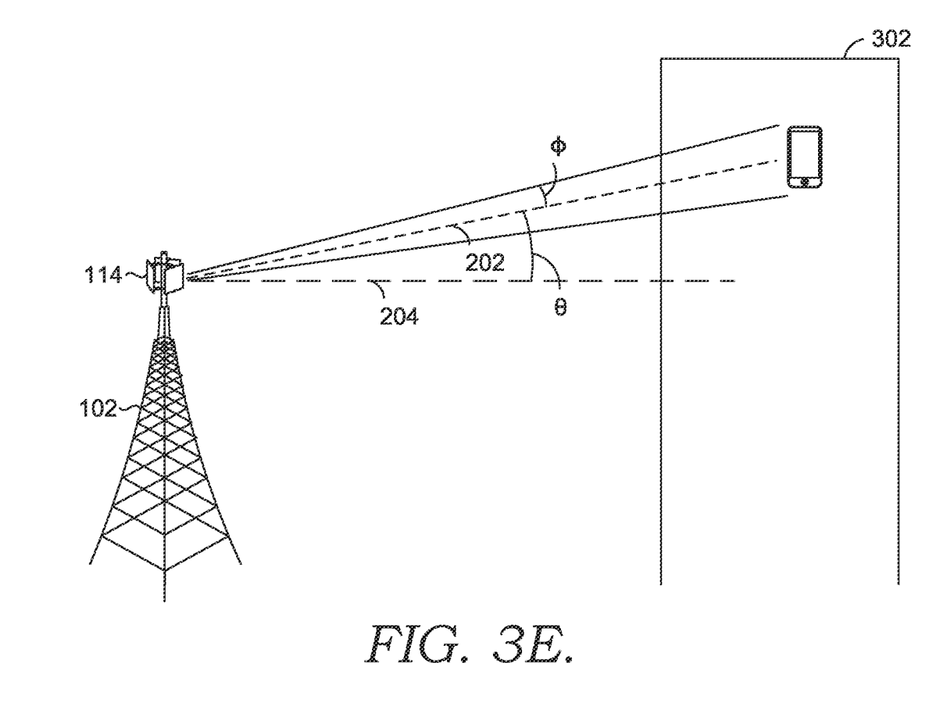

In FIG. 3D, the beam direction axis 202 is raised again based upon the signal strength or other metric and the beam width φ is reduced to further narrow in on the UE 104. In FIG. 3E, the beam direction axis 202 remains unchanged and the beam width φ is further reduced to again narrow in on the UE 104. If a significant drop in signal strength or another metric is noted with a narrow beam width φ, this may be indicative that further refinements of the beam direction axis 202 is needed. In the example of FIGS. 3D and 3E, a high confidence in the beam direction axis 202 may be determined based upon a similar signal strength being received between these two iterations.

Figure 4:
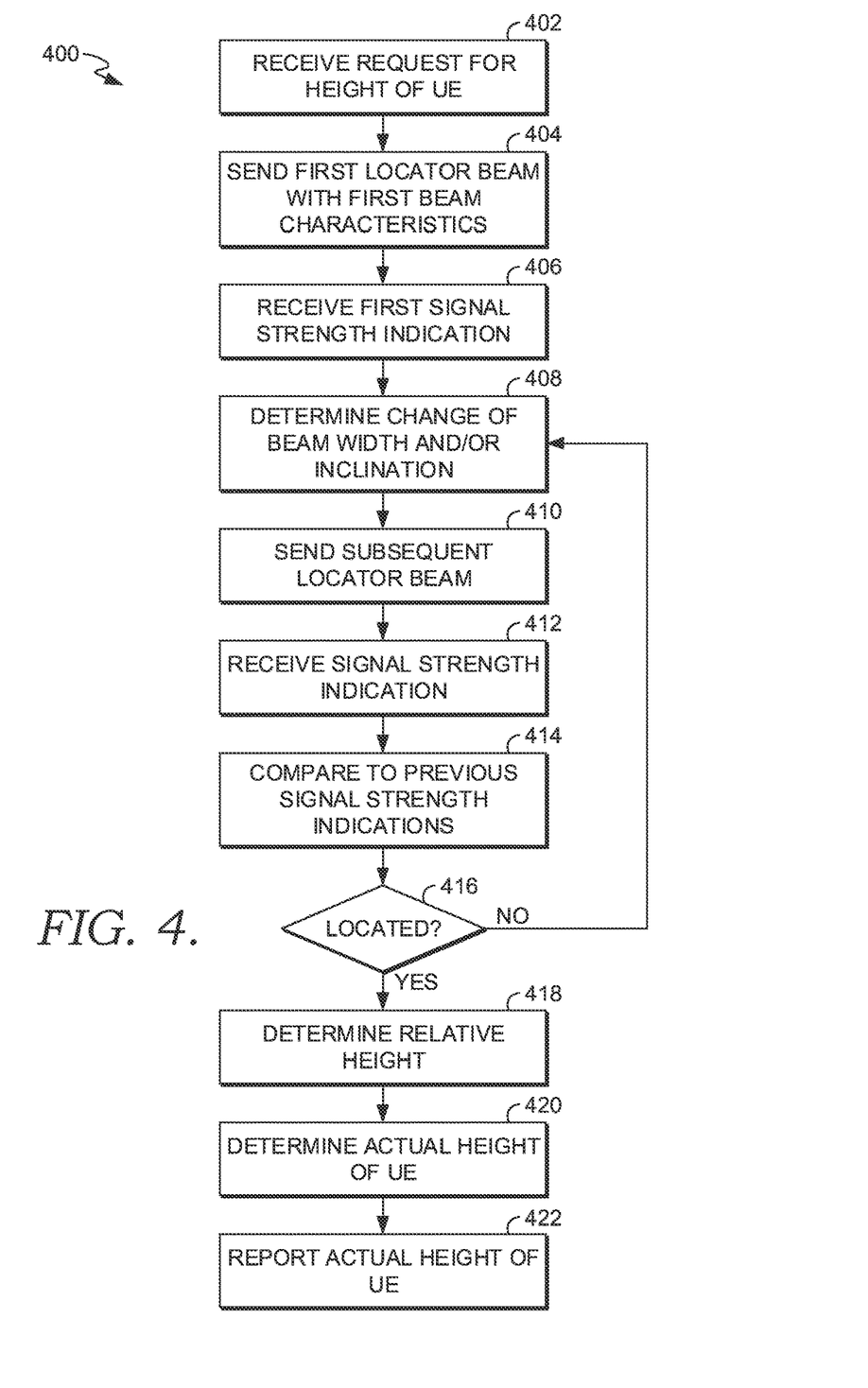
FIG. 4 depicts a flow diagram of an example method for determining the vertical height of the user equipment, in accordance with aspects herein.

FIG. 4 illustrates a computerized method of determining a vertical height of a UE. The vertical height of the UE may be used to locate the UE given a known location of the UE. For example, a known geographic location of the UE does not provide an indication of the height of the UE. Thus, aspects herein may be used to locate the UE within a building having more than one floor. The various steps of the method may be performed by one or more processors, such as a processor in a node, a processor associated with the network, or other processor.

In Step 402, the processor receives a request for a height of a UE. The request, for example, may be received from an emergency call system. The request may be automated upon receipt of an emergency call (such as a 911 call). In other embodiments, the processor proceeds to the other steps described herein without any request based upon the emergency call being transmitted, or upon other factors.

In Step 404, the processor sends a first locator beam with a first set of beam characteristics. The processor may instruct an antenna associated with a node to send the first locator beam. In some embodiments, the first locator beam may be the standard beam sent by the antenna for interacting with the UE (as well as other UEs in the area). A fixed antenna may then send a first beam having a first set of beam characteristics. The first set of beam characteristics may be standardized for locating UEs, may be the current beam characteristics used by the antenna, may be based upon an estimated geographic location of the UE, or other considerations. The first set of beam characteristics may include a first beam width and a first beam inclination, In Step 406, the processor receives a first signal strength indication, directly or indirectly, from the UE. The UE may send a message indicative of the signal strength that it received from the antenna. The antenna may also measure a signal strength of one or more messages from the UE. The antenna may thus acquire a first signal strength indication from the user equipment based upon the first beam. The first signal strength may thus become a baseline metric to which the subsequent beams may be compared. Other metrics beyond signal strength may be used additionally or alternatively.

In Step 408, the processor determines a change of beam width and/or beam inclination. The changes in beam width and/or beam inclination will change the signal strength received and thus allow for the processor to refine a location of the UE. In some instances, the first beam width is wider than a second beam width, so as to narrow the beam. In some instances, the first beam inclination is different than a second beam inclination, so as to induce a different signal strength in subsequent beams.

In Step 410, the processor sends or instructs a subsequent locator beam from the fixed antenna having a second beam and a second set of beam characteristics. The second set of beam characteristics includes the second beam width and the second beam inclination as was determined by the processor in Step 408.

In Step 412, the processor receives a signal strength indication, directly or indirectly, from the UE. The UE may send a message indicative of the signal strength that it received from the antenna. The antenna may also measure a signal strength of one or more messages from the UE. The antenna may thus acquire the second signal strength indication from the user equipment based upon the second beam. The signal strength indication may be received in the same or different manner than was received in Step 406.

In Step 414, the processor compares the received signal strength indication against one or more previous signal strength indications. Based upon the comparison, the processor may determine one or more likely beam directions. For example, if the signal strength increased dramatically, the UE may be located closer to the second beam inclination than the first beam inclination. If the beam width was reduced while keeping the beam inclination steady, a drop in signal strength may be indicative that the beam inclination is accurate.

In Step 416, the processor determines whether the UE has been sufficiently located, or whether further refinement is required. The processor may determine a certainty value and compare the certainty value to a threshold. The certainty value may be indicative of a likelihood that the beam inclination is within a certain range of the UE. The certainty value may be determined by a degree of change from the first signal strength to the second signal strength, an overall signal strength (such as compared to an expected signal strength given the conditions), a number of iterations performed, or other considerations.

If it is determined that the UE has not been sufficiently located, the processor will return to Step 408. In this way, the processor will determine a third set of beam characteristics based at least in part on the first signal strength and the second signal strength. The third set of beam characteristics includes a third beam width and a third beam inclination. In some instances, the third beam width is smaller than the first beam width and smaller than the second beam width. In some instances, the third beam inclination is different than at least one of the first beam inclination and the second beam inclination. The processor will then instruct or send, from the fixed antenna, a third beam having the third set of beam characteristics. The processor will acquire a third signal strength indication from the user equipment based upon the third beam.

If the processor has determined that the UE has been sufficiently located, in Step 418, the processor will determine a relative height of the UE. The processor will analyze the first signal strength and the second signal strength (which may include the third and subsequent signal strengths) to determine the vertical height of the UE. The vertical height of the UE relative to the antenna may be calculated by performing the trigonometric calculations discussed in reference to FIG. 2.

In Step 420, the processor will determine an actual height of the UE, which may include determining an estimated floor upon which the UE is located. The actual height may be determined based upon a vertical height of the fixed antenna that sourced the first beam and the second beam as well as a horizontal distance between the fixed antenna and the UE. The vertical height may be expressed as an estimated floor upon which the UE is located.

In Step 422, the processor will report the actual height of the UE to the emergency call system or other recipient. This may include generating and sending a message indicative of the vertical height to an emergency dispatcher such that emergency services may use the vertical height to located the user equipment. The message may be automatically pushed to the emergency dispatcher, the emergency services, or other recipient. This may allow for the actual height to be sent subsequent to the other information. Pushing a notification or other message may make the actual height readily available to the emergency services such that it can immediately be used in locating the UE in an emergency situation.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, power supply 514, and radio 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD- ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 8708 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for identifying a vertical height of a user equipment, the system comprising:
    a fixed antenna;
    a processor; and
    one or more computer storage hardware devices storing computer-usable instructions that, when used by the processor, cause the processor to:
    send, from the fixed antenna, a first beam having a first set of beam characteristics;
    acquire a first signal strength indication from the user equipment based upon the first beam;
    send, from the fixed antenna, a second beam having a second set of beam characteristics;
    acquire a second signal strength indication from the user equipment based upon the second beam;
    determine a third set of beam characteristics based at least in part on the first signal strength and the second signal strength;
    send, from the fixed antenna, a third beam having the third set of beam characteristics;
    acquire a third signal strength from the user equipment based upon the third beam; and
    analyze the first signal strength, the second signal strength, and third signal strength to determine the vertical height of the user equipment.

2. The system of claim 1,
    wherein the first set of beam characteristics includes a first beam width and a first beam inclination, and
    wherein the second set of beam characteristics includes a second beam width and a second beam inclination.

3. The system of claim 2, wherein the first beam width is wider than the second beam width.

4. The system of claim 2, wherein the first beam inclination is different than the second beam inclination.

5. The system of claim 1,
    wherein the first set of beam characteristics includes a first beam width and a first beam inclination,
    wherein the second set of beam characteristics includes a second beam width and a second beam inclination,
    wherein the third set of beam characteristics includes a third beam width and a third beam inclination,
    wherein the third beam width is smaller than the first beam width and smaller than the second beam width, and
    wherein the third beam inclination is different than at least one of the first beam inclination and the second beam inclination.

6. The system of claim 1, wherein the computer-useable instructions further cause the processor to:
    send a message indicative of the vertical height to an emergency dispatcher such that emergency services may use the vertical height to located the user equipment.

7. The system of claim 6, wherein the vertical height is expressed as an estimated floor upon which the user equipment is located.

8. The system of claim 1, wherein the vertical height of the user equipment is further determined based upon:

a vertical height of the fixed antenna that sourced the first beam and the second beam, and a horizontal distance between the fixed antenna and the user equipment.

9. A computerized method comprising:

sending, from a fixed antenna, a first beam having a first beam inclination;

acquiring a first signal strength indication from a user equipment based upon the first beam;

sending, from the fixed antenna, a second beam having a second beam inclination different than the first beam inclination;

acquiring a second signal strength indication from the user equipment based upon the second beam;

determining a third beam inclination based at least in part on the first signal strength and the second signal strength;

sending, from the fixed antenna, a third beam having the third beam inclination; and acquiring a third signal strength indication from the user equipment based upon the third beam; and analyzing the first signal strength, the second signal strength, and the third signal strength to determine the vertical height of the user equipment.

10. The method of claim 9, wherein the third beam has a third beam width that is smaller than a first beam width of first beam and smaller than a second beam width of the second beam.

11. The method of claim 9, wherein the third beam inclination is different than at least one of the first beam inclination and the second beam inclination.

12. The method of claim 9, further comprising:

sending a message indicative of the vertical height to an emergency dispatcher such that emergency services may use the vertical height to located the user equipment, wherein the vertical height is expressed as an estimated floor upon which the user equipment is located.

13. A system for identifying a vertical height of a user equipment during an emergency call, the system comprising:

an emergency call system configured to respond to the emergency call from a user equipment;

a fixed antenna;

a processor; and one or more computer storage hardware devices storing computer-usable instructions that, when used by the processor, cause the processor to:

receive, from the emergency call system, a request for the vertical height of the user equipment;

send, from the fixed antenna, a first beam having a first set of beam characteristics;

acquire a first signal strength indication from the user equipment based upon the first beam;

send, from the fixed antenna, a second beam having a second set of beam characteristics;

acquire a second signal strength indication from the user equipment based upon the second beam;

determine a third set of beam characteristics based at least in part on the first signal strength and the second signal strength;

send, from the fixed antenna, a third beam having the third set of beam characteristics;

acquire a third signal strength from the user equipment based upon the third beam;

analyze the first signal strength, the second signal strength, and the third signal strength to determine the vertical height of the user equipment; and send, to the emergency call system, an indication of the determined vertical height.

14. The system of claim 13, wherein the first set of beam characteristics includes a first beam width and a first beam inclination, wherein the second set of beam characteristics includes a second beam width and a second beam inclination, and wherein the first beam inclination is different than the second beam inclination.

15. The system of claim 13, wherein the emergency call system is configured to send the determined vertical height to at least one of a dispatcher and an emergency responder.

16. The system of claim 13, wherein the vertical height is expressed as an estimated floor upon which the user equipment is located.

17. The system of claim 13, wherein the vertical height of the user equipment is further determined based upon:

a vertical height of the fixed antenna that sourced the first beam and the second beam, and a horizontal distance between the fixed antenna and the user equipment.

* * * * *